June 23, 1959    R. E. HUNT    2,891,668
STATIC ESCAPEMENT DEVICE
Filed May 31, 1956    2 Sheets-Sheet 1
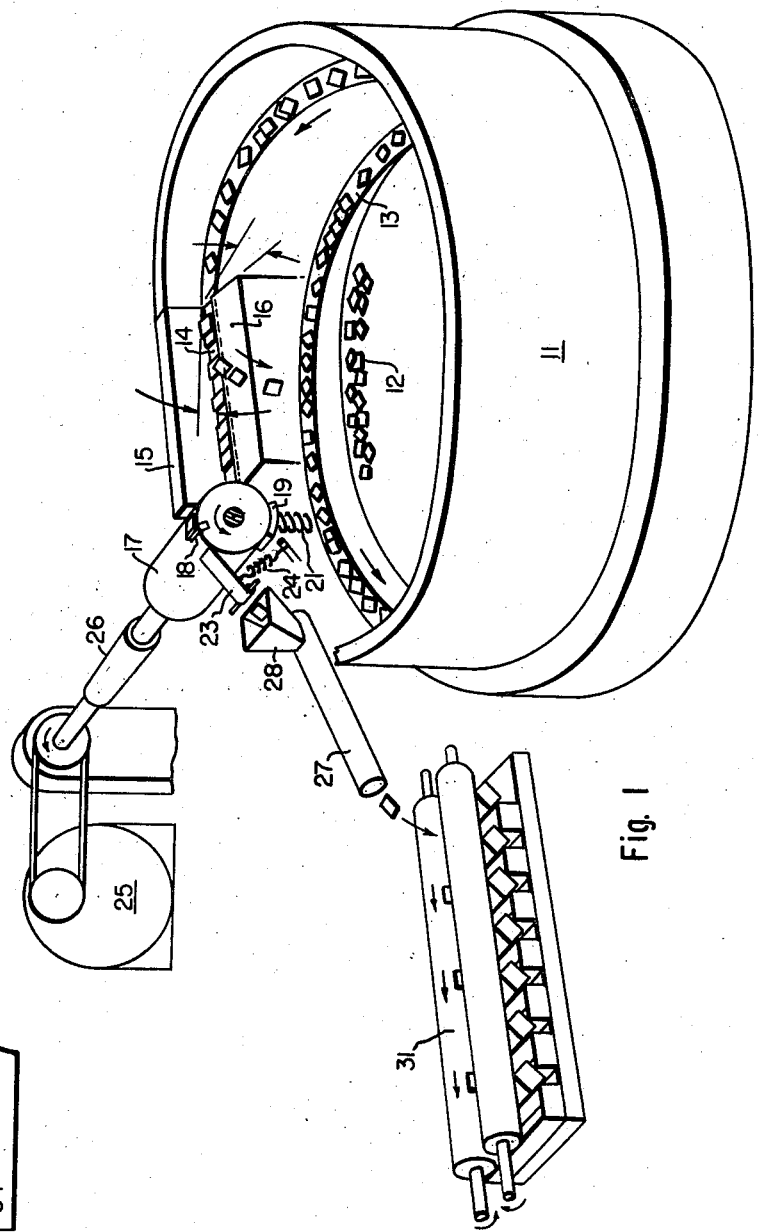
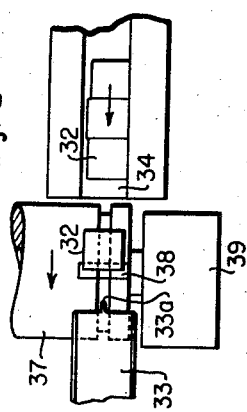
INVENTOR.
ROBERT E. HUNT
BY Kenway, Jenney, Witter & Hildreth
ATTORNEYS

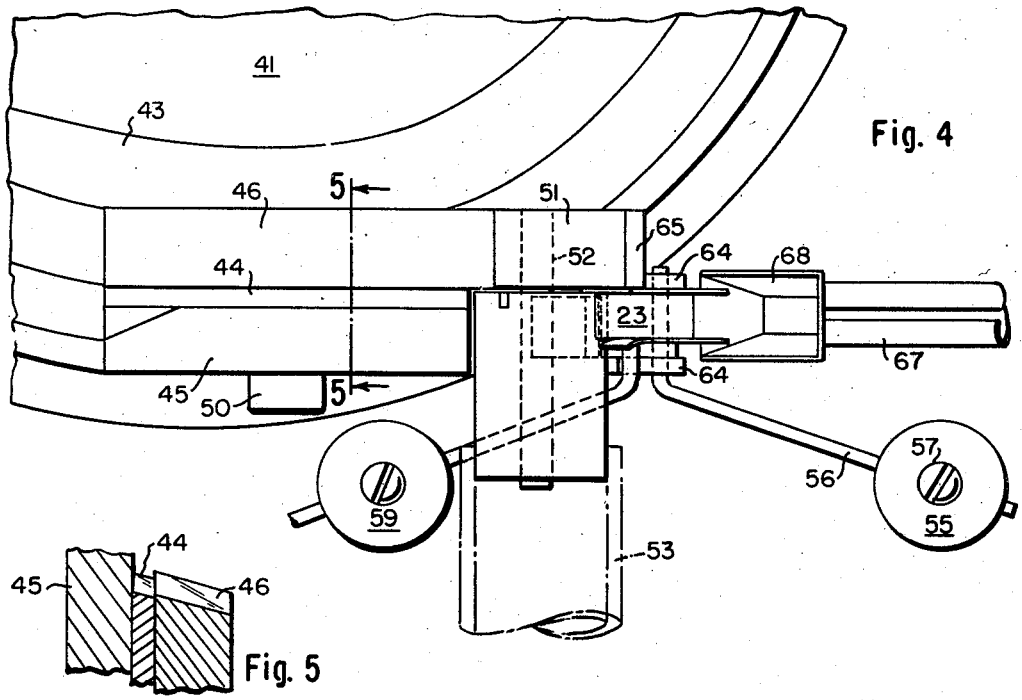
Fig. 4
Fig. 5
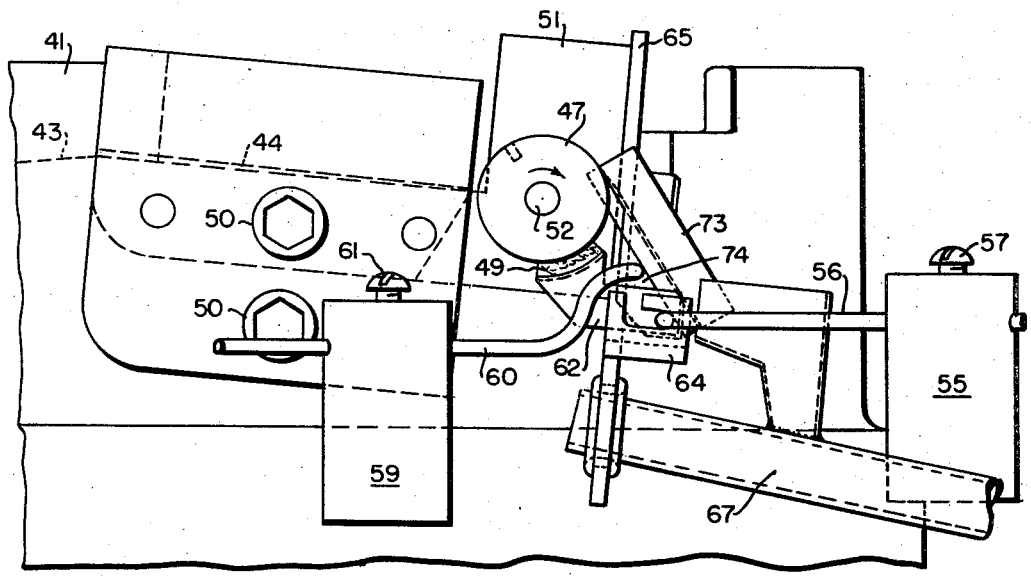
Fig. 3
INVENTOR.
ROBERT E. HUNT

United States Patent Office 2,891,668
Patented June 23, 1959

2,891,668
STATIC ESCAPEMENT DEVICE

Robert E. Hunt, Wakefield, Mass., assignor to Sylvania Electric Products Inc., Salem, Mass., a corporation of Massachusetts Application May 31, 1956, Serial No. 588,403

9 Claims. (Cl. 209—107)

This invention relates in general to devices for handling of small parts, and in particular, to an electrostatic device for such purposes.

One of the more persistent problems which arise in modern high-speed industrial manufacturing, is the handling of small parts without serious loss through damage and breakage. As might be expected, the electronics industry, because of the many components of almost infinitesimal size that are used is particularly plagued by such problems. Recent technological advances have contributed additional difficulties. For example, in the manufacturing of semi-conductor products it is commonplace to utilize components of almost microscopic size.

By way of example, present day semi-conductor transistors and diodes depend for their operation upon so-called "dice" of germanium, silicon, or other semi-conductor material. The nature of the devices as well as the great expense involved in attaining the necessary degree of purity of the dice normally require that each unit include a die of extremely small size. For example, dice which are 80 thousandths by 80 thousandths of an inch square and about 2 thousandths of an inch thick are commonly employed in several of the devices presently being produced.

Because of the direct and controlling effect that they have on the electrical behaviour of completed devices, it is necessary that the dimensions of each die be carefully checked. Actually, however, the thickness is the most critical dimension. Originally, it was the practice for the operator to pick up each die in a pair of tweezers and place it on a flat surface. The probe of a dial indicator was then lowered against the die and the dimension determined with some accuracy. Obviously, it would be impossible to bring the price of semi-conductor devices within the range of general usefulness in consumer products if such practices were continued. Not only was the expense of labor considerable, but the damage caused by handling the very fragile dice with tweezers was excessive. One improvement was suggested and achieved rather widespread acceptance. This improvement consists in the provision of two counter-rotating micrometer rolls which are set at an angle to each other. The surfaces of the rolls are carefully ground and the angle between their axes is adjusted to provide a space between the rolls which increases gradually from one or more to several thousandths of an inch. The entire assembly is tilted at an angle and dice are placed on the rolls and permitted to slide to the point where they fit between the rolls and fall into the proper container below. Micrometer rolls of this sort constitute a partial solution to the problem of measuring the thickness of dice for semi-conductor devices. However, there remains the problem of placing the dice on the rolls for the measuring action to take place. It is still necessary that the dice be placed on the rolls one by one. Obviously, if they were merely dumped on the rolls, two or more could group together and thus defeat the purpose of segregating the dice by thickness. As a result, either the technique of handling each die with a pair of tweezers and placing it on the rolls has continued or an operator brushes the dice gently on to the rolls one-by-one. Damage and breakage of dice was cut down, but a significant amount of such loss is still encountered, and the need for manual labor has been only partially eliminated.

Therefore, it is an object of the present invention to provide apparatus for handling small parts efficiently and automatically.

It is a further object of the present invention to provide electrostatic apparatus for selecting and transporting small parts.

It is a still further object of the present invention to reduce the cost and damage involved in the handling of small parts.

It is another object of the present invention to improve the efficiency of manufacturing semi-conductor devices.

The foregoing objects are attained in the present invention by means of electrostatic apparatus and a vibratory feeder. In a preferred embodiment, the vibratory feeder is of conventional design except for its output track which is preferably modified to present dice one-by-one to the electrostatic escapement device. The electrostatic escapement device which receives the small parts from the vibratory feeder, consists generally in a cylindrical roll having a small peripheral insert of material capable of easily assuming and retaining an electrostatic charge. The cylindrical roll is driven by a motor and each rotation of the roll passes the peripheral insert over a frictional wiping pad which is made of a material determined by the type of material used in the peripheral insert. That is, electrostatic charge is most efficiently placed on the insert by certain combinations of materials in the insert and in the frictional wiping pad. However, numerous combinations of materials work sufficiently well for the purposes of the present invention.

As the insert passes over the frictional wiping pad, it is given an electrostatic charge. The insert continues in its circular path past the end of the output track of the vibratory feeder. The charge on the insert causes it to attract one of the semi-conductor dice which are being presented to it at the end of the output track of the vibratory feeder. The movement and handling of the dice are completely automatic and sufficiently gentle that no damage or breakage ensues.

The peripheral insert need not be of precise dimensions. Its length axially along the roll is preferably wider than the pieces being handled. Its width along the periphery of the roll although not critical, varies to some extent depending upon the size and weight of the objects being handled.

Continued rotation of the cylindrical roll brings the insert to a point which may be approximately opposite the point of pickup. At this opposite point, a scraper or other release mechanism is provided. It may take the form of a thin cantilever tangent spring, or a small trough counterweighted or spring loaded against the cylindrical roll. The objects being handled are removed from the insert by scraping or by full or partial removal of the charge from the insert. The trough then conducts the objects to the micrometer rolls or other processing station.

For a better understanding of the present invention together with other objects, features and advantages, reference should be made to the following detailed description of a preferred embodiment thereof and the accompanying drawings in which:

Fig. 1 is a perspective view, partially cut away, showing the vibratory feeder, escapement device, and micrometer rolls, Fig. 2 is a fragmentary top elevation of one form of the roll, insert, output track and scraper, Fig. 3 is a side elevation of an alternative embodiment of the output track, roll, insert, charging wiper and scraper of the invention, Fig. 4 is a top elevation of the embodiment shown in Fig. 3, and Fig. 5 is a fragmentary sectional view of the output track taken along the line 5—5 of Fig. 4.

In Fig. 1 there is shown a vibratory feeder 11 of a type which is extremely well-known and widely used in the electronics industry. No detailed description of the operation of such devices will be given here. It will suffice to state that operation of vibratory feeders is dependent upon the vibration of a container through a predetermined mechanical cycle. Such a container is usually bowl-shaped, the internal wall of the bowl having an ascending helical path along which small parts are moved by the vibration of the feeder. A quantity of parts is normally placed in the container and the vibrating action moves them toward the periphery of the container. Continued vibration causes the parts to ascend the helical path.

In the present invention, a quantity of dice 12 of semiconductor material such as germanium or silicon, is placed in the container of the vibratory feeder 11. When the vibrating action of the feeder 11 is started, the dice are gradually moved radially outwardly and become distributed in random arrangement along the lower portion of a helical path 13. As the vibration of the device continues, the dice progress along track 13 until they reach a sorting section which includes an output track 14, a wall 15, and an overage section 16.

Wall 15 has a surface abutting one side of track 14 which extends above that side of track 14 to the height of the container wall, although such height is not essential to proper operation of the device. Overage section 16 has a surface abutting the other side of track 14 and is cut at an inwardly inclined rake angle to the horizontal. Output track 14 is similarly inclined, as shown, although less rake is needed in the track.

The surface of overage section 16 which abuts the other side of track 14 extends above that other side to provide a ridge against which dice moving along track 14 ride. The step or depression so formed may be about equal to the thickness of the dice being sorted. It is not necessary, however, that the depth of the step be uniform along the entire length of output track 14. In some cases, it has been found preferable to provide a step which is somewhat deeper than the thickness of the dice at the point of junction between helical path 13 and output track 14, but which gradually decreases in depth so that the step becomes less than the thickness of the dice at some point along the track. Also, as may be seen from the drawing, output track 14 is preferably inclined slightly downwardly from its junction with helical path 13 to its opposite end.

At the opposite end of output track 14 is a static escapement device which includes a cylindrical roll 17. Mounted in the periphery of cylindrical roll 17 is an insert 18 which may be made of any material capable of easily assuming an electrostatic charge and retaining that charge for at least a short period. One material used successfully as an insert is a plastic of the polymerized fluorinated ethylene type sold under the trade name Teflon, although other materials such as nylon, many of the glasses, hard rubber or fibrous materials also operate satisfactorily. It is believed in general, that any material having a relatively high dielectric constant will perform well. In fact, present data would indicate that the higher the dielectric constant of the material, the more efficient the operation of the invention.

The size of the insert 18 is also of relative unimportance within reasonable limits. It is only necessary that the dimension of insert 18 along the periphery of cylindrical roll 17 be sufficiently large to permit the placement thereon of an electrostatic charge capable of holding by its attraction materials of the weight and size being handled. The length of insert 18 along the axis of cylindrical roll 17 is preferably slightly wider than the pieces being handled. The depth of the insert radially of cylindrical roll 17 is also of minor importance inasmuch as the electrostatic charge is primarily a surface phenomenon.

Beneath the cylindrical roll 17 there is provided a frictional wiping pad 19 which may be of felt or other suitable material. Felt has been found to operate very successfully when insert 18 is made of Teflon.

A spring 21 maintains friction pad 19 against cylindrical roll 17 and a pressure adjustment (not shown) is provided to compensate for wear, atmospheric conditions, or other factors affecting the charge impressed by friction pad 19 on insert 18 of cylindrical roll 17. A tangent cantilever scraper 23 of thin material also bears against cylindrical roll 17 adjacent the end where plastic insert 18 is mounted. Contact of scraper 23 with roll 17 is assured by a tension spring 24. A drive motor 25 imparts the necessary rotation to cylindrical roll 17 through a suitable drive mechanism 26. A tube 27 is disposed adjacent to cantilever scraper 23 and dice are fed to tube 27 through a funnel or hopper 28. Tube 27 leads to a micrometer roll device 31 or other suitable sorting or processing mechanism.

In Fig. 2 an alternative embodiment of the escapement device is shown in greater detail. The cylindrical roll 37 is provided with bearing support by an extension journaled in block 39. The peripheral insert 38 has an outer surface conforming to that of the cylindrical roll 37. Numerous non-conducting materials may also be used here for the insert, plastics such as nylon or Teflon being preferred. The dimensions of the insert 38 are of little importance in the axial direction. However, its width around the periphery of roll 37 is preferably somewhat less than that of the dice 32 being picked up to avoid the possibility of picking up more than one die at any time. The end of the output track 34 is preferably spaced by a slight amount from the cylindrical roll 37. This is desirable in order that the charge which is built up on the plastic insert 38 not be discharged to the output track.

A circumferential groove is cut in cylindrical roll 37. The groove passes through plastic insert 38 and cooperating with the groove is an extension 33a of cantilever scraper 33. Preferably, extension 33a is formed as a tab on the end of the scraper 33. Tab 33a conforms in contour and is held in contact with the circumferential groove by counterweighting or spring loading (not shown). In most other respects, the apparatus used in conjunction with this alternative form of escapement device is identical to that described with reference to Fig. 1.

Both spring loading and locking screws have been successfully used in practicing the present invention insofar as retaining the charging pad and die removal device in place against the cylindrical roll is concerned. However, the vibration transmitted from the vibratory feeding device has caused, after long use, fatigue in the springs and loosening of locking screws. In Figs. 3 and 4 there is illustrated a structure which is not prone to difficulties arising from vibration. Furthermore, this illustrated alternative structure incorporates simple means for adjusting the pressure of the charging pad or the removal apparatus on the cylindrical roll as explained in greater detail below.

Vibratory feeder 41 has an ascending helical path 43 formed on its inner wall and terminating at an output track 44. Output track 44 has a width slightly greater than that of dice being handled and is narrower than helical path 43. The wall 45 is cut away diagonally at its corner adjacent helical path 43 to permit easy passage of dice from the helical path 43 to the output track 44. This structure assures a copious and continuous supply of dice to output track 44.

As may best be seen in Fig. 3, output track 44 has a step of gradually decreasing depth formed from helical path 43 to a point adjacent the cylindrical roll 47. This step in conjunction with the raked overage section 46 provides the feature of removing from output track 44 surplus dice which may be riding on each other as does the comparable structure of Fig. 1. The entire assembly of output track 44, wall 45, and overage section 46 may be formed as a unit or in separate pieces as shown. Also as shown these sections may be locked together and rigidly secured to vibrating feeder 41 by screws 50. It has proven to be convenient in the latter type of structure for overage section 46 to be extended outwardly beyond cylindrical roll 47 to form a bearing block 51 in which a central shaft 52 of cylindrical roll 47 is journalled. A rubber coupling 53 may be used to transmit driving power to cylindrical roll 47 and to minimize transfer of vibration.

A wiper counterweight 55 is detachably secured to a pivot rod 56 by means of a screw 57 threaded into counterweight 55 and bearing against rod 56. A similar scraper counterweight 59 is detachably secured to a second pivot rod 60 by means of a screw 61 threaded into counterweight 59 and bearing on rod 60. A charging pad 49 having a felt surface bearing against cylindrical roll 47 is cemented to a flat steel member 62. A portion of member 62 is at an angle of 90° to the portion cemented to pad 49 and extends back from the pad. Rod 56 is soldered or otherwise firmly fixed to the extension of member 62. Rod 56 pivots in a clip member 64 which is fixed to a flat metal strap 65 attached to bearing block 51 by screws (not shown) and having a lower portion in which an opening is formed to support a trough 67.

Clip member 64 provides pivot surfaces for rod 56 at two points on opposite sides of the extension of member 62. Thus, the effect of counterweight 55 is to urge the felt pad 49 against cylindrical roll 47, the pressure being adjustable as a function of the position of counterweight 55 on rod 56.

In somewhat similar fashion the scraper 73 may be adjusted in its pressure against cylindrical roll 47. As may best be seen in Fig. 3, scraper 73 has an underslung pivot section 74 through which a pair of spaced holes are drilled. Pivot rod 56 passes through one of the openings and scraper 73 pivots about that rod. Pivot rod 60 passes through and is soldered in place in the other opening in section 74. Thus, the effect of counterweight 59 is to urge scraper 73 against cylindrical roll 47, the pressure also being a function of the position of a counter-weight, in this case counterweight 59.

Scraper 73 is formed of a bed of spring steel tapered to an edge at its point of tangency with cylindrical roll 47. Side walls are provided, one of which extends below the bed and overlies one end of cylindrical roll 47 to insure that dice being scraped from the insert follow the scraper bed rather than falling into the area between cylindrical roll 47 and bearing block 51. The nearer wall, as seen in Fig. 3, extends only to the scraper bed and is flared outwardly, as best shown in Fig. 4 to accommodate dice which are not precisely centered on the insert of cylindrical roll 47. Scraper 73 is terminated at its lower end within a hopper 68 which in turn feeds into and is supported by trough 67.

The fragmentary sectional view labelled Fig. 5 is included to show more clearly the configuration of the output track 44 and raked overage section 46 in one embodiment of the invention. Output track 44 slopes downwardly from its junction with helical path 43 toward its end adjacent cylindrical roll 47. So, also, does overage section 46, which may be in a plane parallel to that of track 44 if a step of constant depth is used, or the overage section may be sloped more steeply, as shown, than track 44 if a step of gradually decreasing depth is desired. As is clearly shown in Fig. 5, both output track 44 and overage section 46 are cut at a rake angle to the horizontal to insure that surplus dice find their way back into vibratory feeder 41. An angle of 15° has been found to be very satisfactory for purposes of this invention.

The alternative structure of the cylindrical roll shown in Fig. 2 may of course, be utilized in the embodiment shown in Figs. 3 and 4. It is necessary only to modify the scraper to provide a tab at its end cooperating with the groove of the cylindrical roll.

The operation of the present invention will be described with reference to Fig. 1, but the description is, of course, applicable with minor variations to other embodiments of the inventions previously discussed. The operation commences with the placement of a quantity of dice in the vibrating feeder. The dice are vibrated outwardly toward the periphery of the container and then follow the helical path 13 until they arrive at the output track 14 where some of the dice may be doubled or tripled up one on another. At this point they encounter the inward rake of the output track. Continuing motion of the vibratory feeder causes excess dice to be shaken off output track 14 over the ridge formed by the abutting surface of the overage section 16. The inward rake of overage section 16 directs the excess or surplus dice back into the feeder. By the time the dice reach the end of output track 14 adjacent cylindrical roll 17, where the depth of depression of track 14 is equal to or less than the thickness of the dice, none of the dice are riding on others and they are in single file so that only one at a time is attracted by the insert 18 in cylindrical roll 17.

As cylindrical roll 17 rotates past friction pad 19, the rubbing action of insert 18 over the pad 19 causes an electrostatic charge to be built up on the surface of insert 18. Insert 18 continues in its rotational path past the edge of the output track 14. The first die in line is then picked up by insert 18 and carried upwardly and over to scraper 23. At that point, scraper 23 scrapes or lifts the die from the insert 18 and also may remove some or all of the static charge from insert 18. The die then falls into tube or trough 27 and ultimately to micrometer roll device 31 or other processing station. Continued rotation of cylindrical roll 17 passes insert 18 over friction pad 19 once more, placing a new charge on insert 18. Again the pickup and discharge of a die is effected in the manner described above.

Dice being fed along output track 14 need not necessarily be synchronized with the rotation of cylindrical roll 17. In fact, the action of the vibratory feeder 11 is normally set to provide more dice than are required to keep pace with the rotation of cylindrical roll 17. Extra dice at the end of track 14 which are not picked up by insert 18 fall back into the container in the same manner as surplus dice on the other portions of track 14 fall back. Again, this is effected by overage section 16. The speed of operation can be varied over a wide range merely by increasing the speed of rotation of cylindrical roll 17.

Parenthetically, it should be noted that the overage section need not be the massive structure disclosed. Where, for example, it is not desired to use an extension of the overage section as a bearing block, a length of sheet material may be bolted to the inner side of the output track in such position that its upper edge extends above the inner side of the track by a uniform or a gradually decreasing amount. The height of the ridge so formed, as in other embodiments disclosed in detail above should preferably be slightly less than the thickness of the dice at some point along the track.

No necessity exists to electrically isolate the various parts such as the vibratory feeder, rotating shaft 17, scraper 23, or drive motor 25. The invention has been successfully operated even though all of these elements are at the same potential. The only limitation presently known as a possible source of difficulty is the location of the end of output track 14 relative to cylindrical roll 17. If the spacing is too close, the insert 18 may conceivably be discharged as it passes the edge of output track 14.

There is no apparent limit to the number of different materials which may successfully be used as insert 18. Many of the plastics, glasses and fibers will operate successfully. Also, the insert need not be an "insert" as such but may be mounted at or on the outer surface of the member which supports it. It is also possible that the cylindrical roll 17 or other support member be made of a non-conductor. The illustrated structure is presently preferred, however, to avoid charge on points other than at the insert.

All types of materials may be handled by the apparatus. Semi-conductors, conductors, and insulators have all been successfully handled by the electrostatic escapement device. Electrical charge on the insert is believed to be a surface phenomenon and not to exist throughout the insert. Because of this localized charge, no tendency to leak off through the surrounding metal has been noticed.

Alternative means and methods, other than the scraper devices described above may be employed for unloading the small parts from the insert. For example, electrical discharge of the insert may be accomplished with simultaneous unloading of the part, by passing the insert through an area adjacent radioactive emanation. Thus, one or more electrodes having radioactivated material at their tips adjacent the path of rotation of roll 17 can discharge insert 18 and cause non-contacting unloading of parts held to insert 18 by its electrostatic charge.

Although the invention has been described with reference to particular embodiments useful in the handling of semi-conductor dice, it is believed that applications of the invention to the handling of small parts of various types or descriptions, will be apparent to those skilled in the art. Nor should the invention be limited to such devices as cylindrical rolls. It would be entirely practical to apply the principles of the invention to a conveyor belt having chargeable pieces along its length. Also, the motion between the parts being handled, the charging device and the unloading device relative to the member being charged is susceptible of many modifications. Thus, the invention should be limited only by the spirit and scope of the appended claims.

What is claimed is:

1. Apparatus for handling small objects comprising a body, a piece of non-conducting material disposed on the outer surface of said body, means for placing an electrostatic charge on said piece, means for feeding and positioning each of said objects in sequence adjacent said body and means for moving said body to pass said electrostatically charged piece near the one of said objects adjacent said body, whereby said one object is picked up by said piece by electrostatic attraction and another object is positioned adjacent said body.

2. Apparatus for selecting individual parts from a group of small parts comprising a supporting member, an insulating member on the outer surface of said supporting member, means for placing an electrostatic charge on said insulating member, feeding means for providing a continuous supply of small parts from said group and placing each small part in sequence adjacent said supporting member, and means for providing relative motion between said supporting member and said feeding means whereby the small part adjacent the supporting member is selected from said parts by electrostatic attraction as the spacing between said insulating member and said small part adjacent the supporting member approaches a minimum, said feeding means immediately placing the small part next in sequence in position adjacent the supporting member.

3. Apparatus for selecting individual parts from a group of small parts comprising a cylindrical supporting member, an insulating member mounted at the outer surface of said supporting member, means for periodically placing an electrostatic charge on said insulating member, feeding means for providing a continuous supply of small parts from said group and placing each small part in sequence adjacent the cylindrical supporting member, and means for rotating said cylindrical supporting member whereby said insulating member picks up the small part adjacent the cylindrical supporting member by electrostatic attraction, said feeding means immediately placing the small part next in sequence in position adjacent the cylindrical supporting member.

4. Apparatus for selecting individual parts from a group of small parts comprising a supporting member, an insulating member mounted at the outer surface of said supporting member, a friction pad, means for passing said supporting member over said friction pad whereby an electrostatic charge is placed on said insulating member, feeding means for providing a continuous supply of small parts from said group and placing each small part in sequence adjacent the supporting member, and means for moving said supporting member to pass said insulating member near said supply of small parts whereby said charged insulating member selects the small part adjacent the supporting member therefrom by electrostatic attraction, said feeding means immediately placing the small part next in sequence in position adjacent the supporting member.

5. Apparatus for handling small parts comprising means for feeding parts sequentially along a track and positioning each part in turn at a terminus thereof, a body disposed adjacent the terminus of said track, an insulating member mounted at the outer surface of said body, a friction pad adjacent said body, a take-off device adjacent said body, and means for moving said body to provide motion of said insulating member relative to said friction pad, to said terminus of said track, and to said take-off device, said insulating member becoming charged electrostatically by passing over said friction pad, picking up the part at said terminus of said track as it passes said terminus of said track by electrostatic attraction, and dropping said unit as it passes said take-off device, the part next in sequence becoming positioned at said terminus by said feeding means immediately upon picking up of said part at said terminus by the charged insulating member.

6. Apparatus for handling small parts comprising a track for sequentially feeding said parts along a line to a terminus thereof, a cylindrical metallic roll adjacent said terminus, an insulating member mounted at the periphery of said cylindrical metallic roll, a friction pad disposed adjacent said cylindrical metallic roll, a drive motor for rotating said cylindrical metallic roll, and a take-off device disposed adjacent said cylindrical metallic roll opposite the terminus of said track, rotation of said cylindrical roll causing in sequence, electrostatic charging of said insulating member by said friction pad, picking up of the part at said terminus by the electrostatic attraction of said charged insulating member, and at least partial discharge of said insulating member and take-off of said part by said take-off device, the part next in sequence along said line being fed to said terminus adjacent the cylindrical metal roll immediately upon picking up of the part at said terminus.

7. Apparatus for handling small parts comprising a vibratory feeder including an output track, an overage section joined to said output track, said overage section having a first surface abutting one side of said track and extending above said one side of said track an amount not greater than the thickness of said parts and having a second surface intersecting said first surface and inclined downwardly from a plane normal to said first surface along the intersection of said first and second surfaces, a cylindrical roll adjacent the end of said output track, an insert of insulating material embedded in said cylindrical roll, means for rotating said cylindrical roll, a friction pad disposed adjacent and urged against said cylindrical roll for placing an electrostatic charge on said insert in response to rotation of said roll, said small parts being attracted to said insert and removed from said end of said output track by said electrostatic charge, and means for removing said small parts from said insert.

8. Apparatus for handling small fragile parts comprising, a vibratory feeder including a container having the general shape of a bowl, an ascending helical path formed internally on the side wall of said container, and means for vibrating said feeder in a predetermined mechanical cycle to cause said small parts to follow said ascending helical path, an output track having one end disposed adjacent the upper end of said helical path, a wall defining one side of said output track, said wall constituting substantially a continuation of said side wall of said container, an overage section defining the other side of said output track and consisting of a flat metallic surface disposed at rake angle inward and downward of the junction of said wall and said output track, said output track having a longitudinal slope downward from its end adjacent said helical path and a lateral slope corresponding to the slope of said overage section, said output track being depressed from the highest point of said overage section along at least a part of its length an amount not greater than the thickness of one of said small parts, a cylindrical roll disposed adjacent the other end of said output track, a peripheral insert of non-conductive material embedded in said roll, said cylinder having a peripheral groove cut therein, said groove passing through said peripheral insert, a wiping pad disposed beneath said cylinder, means for urging said wiping pad against said cylinder in the area of said peripheral groove, means for adjusting the pressure of said wiping pad against said cylinder, a scraper disposed on the side of said cylinder opposite said output track, a tab formed on one end of said scraper conforming in contour to and disposed within said peripheral groove, means for urging said one end of said scraper against said cylinder, means for adjusting the pressure of said scraper against said cylinder, a hopper disposed adjacent and enclosing the other end of said scraper, a trough fed by said hopper, a micrometer roll fed by said trough, and means for rotating said cylinder to cause said insert to be electrostatically charged by said wiping pad and discharged by said scraper whereby said small parts are attracted to and conveyed by said insert from said output track to said scraper.

9. Apparatus for removing individual parts from a randomly arranged supply of said parts comprising feeding means for moving a stream of said parts to a terminal portion of the feeding means, a conveying member having a continuous surface presented toward said terminal portion, a first portion of said surface being electrically conductive and a second portion being nonconductive, driving means for said conveying member to cause movement of said continuous surface past the terminal portion at a constant distance therefrom and in contact with friction means for applying an electrostatic charge to said second portion, said member being disposed with respect to said terminal portion so that the continuous surface of the member blocks movement of said stream of parts from said terminal portion when the conducting portion of said surface is presented at the terminal portion and picks up one of said parts when the electrostatically charged nonconducting portion of said continuous surface is presented at the terminal portion.

References Cited in the file of this patent

UNITED STATES PATENTS

| 1,916,109 | Hall | June 27, 1933 |
| 2,343,042 | Barry | Feb. 29, 1944 |
| 2,570,288 | Todd | Oct. 9, 1951 |
| 2,576,882 | Koole et al. | Nov. 27, 1951 |
| 2,646,880 | Frankel | July 28, 1953 |
| 2,725,971 | Clark-Riede | Dec. 6, 1955 |
| 2,796,986 | Rajchman et al. | June 25, 1957 |
| 2,806,494 | Kull | Sept. 17, 1957 |

FOREIGN PATENTS

| 468,692 | Great Britain | July 6, 1937 |